US008334770B2

(12) United States Patent
Gurton

(10) Patent No.: US 8,334,770 B2
(45) Date of Patent: Dec. 18, 2012

(54) BODY MOUNTED DETECTOR AND METHOD FOR DETECTING FLASH IN SOLAR BLIND ULTRAVIOLET SPECTRAL REGION

(75) Inventor: Kristan Peter Gurton, Olney, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 719 days.

(21) Appl. No.: 12/533,611

(22) Filed: Jul. 31, 2009

(65) Prior Publication Data

US 2011/0025521 A1    Feb. 3, 2011

(51) Int. Cl.
    *G08B 21/00* (2006.01)
(52) U.S. Cl. .................... 340/540; 89/41.06
(58) Field of Classification Search .............. 340/540, 340/578, 686.1; 250/234, 216, 330, 339.15; 89/1.11, 41.06, 41.08; 381/56
    See application file for complete search history.

(56) References Cited

U.S. PATENT DOCUMENTS

| 5,612,676 | A | 3/1997 | Plimpton et al. | |
|---|---|---|---|---|
| 5,686,889 | A | 11/1997 | Hillis | |
| 6,178,141 | B1 * | 1/2001 | Duckworth et al. | 367/127 |
| 7,409,899 | B1 * | 8/2008 | Beekman | 89/1.11 |
| 7,432,498 | B2 | 10/2008 | Capron et al. | |
| 7,947,954 | B2 * | 5/2011 | Snider et al. | 250/336.1 |
| 2010/0278347 | A1 * | 11/2010 | Succi et al. | 381/56 |
| 2011/0170798 | A1 * | 7/2011 | Tidhar | 382/276 |
| 2012/0001071 | A1 * | 1/2012 | Snider et al. | 250/336.1 |

OTHER PUBLICATIONS

E. Trakhovsky, A.Ben-Shalom, et al, "Contribution of oxygen to attenuation in the solar blind UV spectral region", Applied Optics, vol. 28, No. 8 pp. 1588-1592 (1989).
E. Carapezza, "Tactical Sensors Program", Defense Technical Information Center (DTIC) Technical Report # ADD950587, (1998).
Engineering Design Handbook. Spectral Characteristics of Muzzle Flash, Edited by the Franklin Institute Research Lab., Army Materiel Command Document DTIC # AD818532 (1967).
B. K. Ng. John P.R. David, "Nonlocal Effects in Thin 4H-SiC UV Avalanche Photodiodes", IEEE Trans. on Electron devices, vol. 50, No. 8 pp. 1724-1732 (2003).
X. Xin, F. Yan, "Demonstration of 4H-SiC single photon counting avalanche photodiodes", Electronics Lett., vol. 41, No. 4, (2005).
R. McClintock, J Luis Pau, "III-Nitride photon counting avalanche photodiodes", Quant. Sensing and Nonphotonic Devices V, Proc. Of SPJE, vol. 6900 69000N-I (2008).
"Tiny Avalanche Photodiode Detects Single UV Photons", Northwest University Center for Quantum Devices (CQD), ScienceDaily, Oct. 2008.

(Continued)

Primary Examiner — Brent Swarthout
(74) Attorney, Agent, or Firm — Lawrence E. Anderson; Eric B. Compton

(57) ABSTRACT

A detector assembly for detecting a flash from the firing of a weapon comprising: a first support; a plurality of sensors supported by the first support for detecting light from the flash; the sensors operating to receive light in the range of ultraviolet light from approximately 100 nm to approximately 290 nm; a directional indicator for indicating the directional location of the first support; and an indicator assembly comprising at least one indicator; the at least one indicator operating to display the directional location of the flash.

23 Claims, 4 Drawing Sheets

OTHER PUBLICATIONS

M. C. Ertem. R. B. Pierson, "An Acoustic Sensor for the Viper Infrared Sniper Detection System", Defense Technical Information Center (DTIC) Technical Report # ADA389874. (1999).

RIchardson, D., "Spectrographic Studies of a Railgun Muzzle Flash," Materials REsearch Labs Ascot Vale (Australia) Defense Technical Information Center (DTIC) Technical Report No. ADA156607 Feb. 1985.

M. Kastek et al. "Electro-optical system for gunshot detection: analysis, concept, and performance", International Symposium on Photoelectronic Detection and Imaging 2011: Advances in Infrared Imaging and Applications, Proc. SPIE 8193, 81933W (2011).

D. Lindgren et al. "Multisensor configurations for early sniper detection", Proc. SPIE 8186, 81860D (2011).

M. Kastek, et al., "Sniper detection using infrared camera: technical possibilities and limitations", Sensors, and Command, Control, Communications, and Intelligence (C3I) Technologies for Homeland Security and Homeland Defense IX, Proc. SPIE 7666, 76662E (2010).

"SBUV: Rifle Shot, Gunshot, Firearms & Small Arm Shooting/Firing Detection." Ofil's SBUV Website. [available at: http://www.sbuv.com/RifleShooting/index.html].

* cited by examiner

BODY MOUNTED DETECTOR AND METHOD FOR DETECTING FLASH IN SOLAR BLIND ULTRAVIOLET SPECTRAL REGION

GOVERNMENT INTEREST

The invention described herein may be manufactured, used, and/or licensed by or for the United States Government.

FIELD OF THE INVENTION

This invention relates generally to detection equipment and a method of detecting, and more particularly to ultraviolet detection.

BACKGROUND OF THE INVENTION

Background patents include U.S. Pat. No. 7,409,899 (899 patent) entitled "Optical detection and location of gunfire," by Beekman, hereby incorporated by reference. The '899 patent discloses an optical gunfire detection system comprising an image-capturing device operable for detecting light; a narrowband Fraunhofer line filter connected to the image-capturing device, and operable for partially restricting transmission of the light; a convex parabolic reflector operable for transmitting images to the image-capturing device; a lens system; an image storage device connected to the image-capturing device, wherein the image storage device comprises a solid-state digital memory unit operable to store multiple seconds of video imagery; a real-time computer-implemented mechanism connected to the image storage device, the computer-implemented mechanism operable for detecting locations and classifications of gunfire associated with the images; an acoustic device in communication with the computer-implemented mechanism, and operable for verifying the classifications of the gunfire; a position laser operable for identifying the locations of the gunfire; and a defense mechanism comprising the laser pointer and operable to defend against a source of the gunfire.

U.S. Pat. No. 5,686,889, hereby incorporated by reference, entitled "Infrared sniper detection enhancement," to Hillis is directed to the concept that firing of small arms results in a muzzle flash that produces a distinctive signature conducive to automated or machine-aided detection with an IR (infrared) imager. The muzzle flash is intense and abrupt in the 3 to 5µ band. A sniper detection system operating in the 3 to 5µ region must deal with the potential problem of false alarms from solar clutter. The invention reduces the false alarm rate of an IR based muzzle flash or bullet tracking system (during day time) by adding a visible light (standard video) camera. A standard video camera helps detect (and then discount) potential sources of false alarm caused by solar clutter. If a flash is detected in both the IR and the visible spectrum at the same time, then the flash is most probably the result of solar clutter from a moving object. If a flash is detected only in the IR, then it is most probably a true weapon firing event.

U.S. Pat. No. 5,612,676, entitled "Dual channel multi-spectrum infrared optical fire and explosion detection system," to Plimpton, discloses a fire detection system including two optical sensing channels and signal processing circuitry that processes the two sensing channels' output signals and generates another output signal when the processed signals are indicative of a fire. The system automatically detects hydrocarbon and certain nonhydrocarbon fueled fires.

U.S. Pat. No. 7,432,498 entitled "Method and apparatus for optically detecting and identifying a threat," to Capron, discloses an optical detection apparatus includes a housing having a circumferential opening therein. A primary mirror reflects light rays to form a first set of light rays to a secondary mirror that has a generally concave shape coupled to the housing.

Currently, there is a great need to quickly identify the direction and location of small arms fire experience by the war fighter, i.e., the location of a sniper. This problem is compounded when the soldier is operating in cavernous/mountainous or urban regions where acoustic cues are ineffective. A primary hazard facing soldiers on the battlefield is the ever increasing threat of being injured by sniper attack, This threat exists in both rural and urban environments. There are numerous efforts to develop instrumentation capable of detecting the direction and/or location of a rougue sniper. Usually these techniques are based on either an acoustic signal from the small arms fire, or the detection of the resultant thermal signature as recorded by an IR sensor. However, both systems require instrumentation that is fairly large and expensive and not appropriate for being deployed on each and every soldiers who needs such protection. In addition, systems based on acoustic triangulation are prone to inaccuracies due to multiple acoustic reflections, and optical detection methods that use thermal signature are very costly and suffer from frequent false alarm rates.

Accordingly there is need for a method and/or device which addresses all concerns related to: 1) the detectability of a weak optical signal that results when a small arm is fired, 2) the accuracy and reliability of a triggered event, i,e. low false alarm rates, 3) portability so that the envisioned device adds no appreciable weight or size to the current soldier's payload, and 4) economical cost for each unit at a price point low enough as to allow for large scale deployment.

SUMMARY OF THE PRESENT INVENTION

A preferred embodiment sniper detection device comprises a polar-array of detectors 3, which may be, for example, APD detectors (and associated electrical circuitry as known by those skilled in the art) mounted on a support 2, which may be movable or stationary, such as a soldier's helmet, human body, motor vehicle, etc. A preferred embodiment further comprises is a coordinate registering device 5, which also may be mounted within the support 3, and which may be, for example, a digital compass. An indicator display 9, comprising a plurality of indicators 8 may for example, be a circular LED display worn may be worn on the soldier's wrist and capable of real-time wireless communication with the registering digital compass, as depicted in FIG. 3. For the preferred embodiment shown in FIG. 2, a polar-array of SBUV sensitive avalanche photodiodes (APD) 3 may number in the range of 6-12 sensors and are mounted within the body or on a soldier's helmet. Each detector is specially designed to be insensitive to visible or IR light, or spectrally filtered to block such radiation. The D.C. power, such as a battery, and needed detector electrical circuitry can be self-contained within the helmet or support structure 2. In the embodiment shown in FIG. 4, a digital registering compass 5 operates to continuously monitor direction and orientation of the sensors 3. Upon detection of a transient event in the SBUV (i.e., a signal above some threshold value and fairly short in duration), a coordinate "stamp" is recorded within, for example, a microprocessor that relates a particular detector to a fixed direction, e.g., south-east, as depicted by arrow in FIGS. 2-4. The coordinate stamp may be communicated to a circular light emitting diode (LED) display 9 mounted on the soldier's wrist via an appropriate wireless communications protocol, such as for example, Bluetooth transmitters and receivers 6, 7, as depicted in FIG. 4. The coordinate stamp is updated via the digital compass and registered on the LED display 9 at a sufficiently high rate, e.g., 20 Hz, such that the correct direction of the sniper fire is continuously and correctly displayed on the wrist mounted monitor regardless of soldier's rotation or movement.

A preferred embodiment offers a small portable package having low electrical power consumption and provides ease of use. Excellent S/N is obtainable by judiciously choosing to operate in the SBUV and using, for example, UV APD sensors 3 that are biased in a Geiger mode. Virtually all fires emit radiation in the Ultraviolet C (UVC), short wave band 280 nm-100 nm (4.43-12.4 eV), while the Sun's radiation at this band is substantially absorbed by the Earth's atmosphere. Accordingly, the sensors of the present invention may operate in the UV band of 100 to approximately 290 nm and preferably in the solar blind ultraviolet region of 230-290 nm. This configuration is optimized to produce low false alarm rates with very high sensitivity.

Although the design is specifically tailored for the real-time detection of muzzle flash resulting from small arms fire, and any similar transient optical event may be detected in substantially the same way, such as a light signal.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings.

Figure 1:
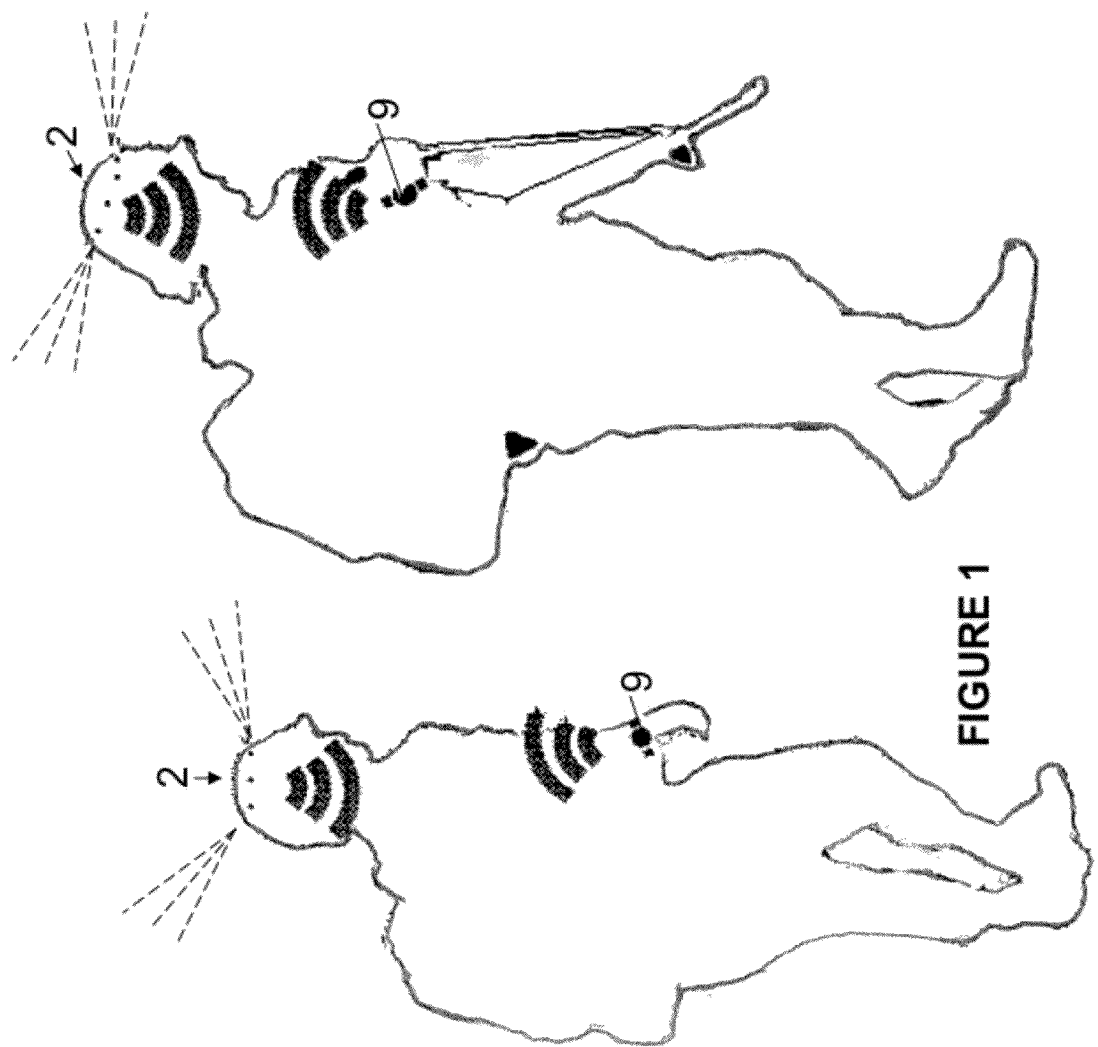
FIG. 1 is a diagrammatic illustration of Soldiers on patrol wearing helmet (designated as 2) mounted array of LTV avalanche photodiodes (APD), and wrist mounted LED position display 9. Communication between helmet array and LED display may be via appropriate wireless communication protocol, e.g., Bluetooth.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION OF THE PREFERRED EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

It will also appreciated that the terminology body encompasses a human body or the body of an object such as a motor vehicle or housing, whether stationary or movable.

The current state-of-the-art sensor devices rely on acoustic triangulation of three or more acoustic transducers, usually requiring separation of the sensors on the order of a meter or so making the overall sensor dimensions fairly large and cumbersome. Also such acoustic based systems are plagued by multiple scattering of the acoustic signal from surfaces, i.e. "buildings, walls, and natural terrain, thus rendering false directions. Similar systems have been augmented with infrared (IR) optical sensors (sensitivity 1-5 µm) to improve detectability at the expense of significantly increasing the cost per unit. Similarly, such systems that operate in the IR spectral region are often plagued be significant solar radiance (relative to the signal being detected). As a result the optical noise due to the solar energy greatly reduces the ability to detect a faint thermal signature that results from small arms fire. The present invention is constructed to operate in the Solar Blind Ultraviolet (SBUV) region of the atmospheric electromagnetic (EM) spectrum, i,e., wavelengths between 230-290 nm, which is devoid of such high levels of ambient noise energy. The sensitivity of a preferred embodiment is enhanced by using UV avalanche photodetectors (APD) operated in a Geiger mode, which offer detectability on the order of a single UV photon detection.

A preferred embodiment of the present invention operates to reduce ambient sources of optical noise inherent to the problem by operating in a solar blind region, and utilizes a detection sensor that will produce the maximum signal. The combination of minimizing noise (due to optical and electronic sources) while maximizing the actual target signal potentially results in a superior signal to noise S/N ratio for the entire detection configuration. Such a system potentially produces optimum detection rates while simultaneously suppressing the probability of a false alarm.

One principle of the present invention is the discovery that in order to reduce the ambient noise level for a optically based system, a specific "optimum" region of the atmospheric electromagnetic (EM) spectrum needs to be identified first. This optimum spectral region should be devoid of any ambient sources of radiation that might be misconstrued as an actual event, i.e., muzzle flash. The ideal spectral region could be thought of producing a truly black background. Not only should this spectral region be devoid of any significant ambient noise energy, but must also coincide with a detectable portion of EM spectrum that results from the initial and/or secondary "flash" event when a small arms ammunition is fired. As far as the propagation of the optical signals through the atmosphere, in general, most optical signals are attenuated to varying degrees as they propagate through the atmosphere over long distances, e.g., attenuated primarily by atomic/molecular absorption and aerosol scattering.

The optimum region for practical optical detection of the radiant flash that results from small arms fire lies in the ultraviolet region approximately defined by 230-290 nm, often referred to the Solar Blind Ultraviolet (SBUV). At ground level practically all of the ultraviolet light emitted by the sun is absorbed by ozone that resides in the upper troposphere. Not only is this spectral region devoid of large amounts of ambient energy, research shows significant detectable signal in the SBUV resulting from ignition of ammunitions associated with small arms fire. In addition, the attenuation due to gaseous ozone in the upper troposphere is not present at ground level and the primary mechanism for attenuation in the SBUV is due to aerosol scattering. Calculations (and a few reported findings) reveal that detection on the order of 1 km may be obtainable.

A muzzle flash event may result in a faint SBUV signal requiring a detector package capable of detecting such events, as well as operating with very low electronic noise levels (low dark current) while producing very high sensitivity approaching that of single photon detection. Additional requirements include minimal power requirements and ruggedness or durability sufficient to survive a harsh battlefield environment.

Examples of two possible sensors 3 for implementation of a preferred embodiment of the present invention are a highly sensitive Photo-multiple tube (PMT) detector, and a Si based Avalanche Photodiode (APD). Due to the fragile nature of (PMT) and the requirement for large biasing voltages (typically around 1500 V), the PMT may be somewhat unsuitable or impractical for some deployment applications. The Si based APD detectors usually have peak response in the visible (wavelengths around 500 nm) and may not offer the desired sensitivity for operation of some applications in the SBUV. However, some applications may be found to be suitable due to the mature nature of the APD technology, i.e., very inexpensive, sensitive, and requires very low biasing (5-10V). A preferred embodiment comprising SBUV filtered Si based APDs operating in "Geiger" mode (biased slightly above the semi-conductor breakdown voltage) may be sufficient for some applications.

In a preferred embodiment, the detectors 3 comprise 4H-SiC UV APD or III-Nitride UV APDs. Two detector classes currently under development that offer the greatest detector solution package for the device envisioned and described herein are both of these solid-state detector materials are based on a modified APD detectors approach, and both offer near single photon detection approaching that of a conventional UV PMT, i.e., very high gain and relatively low dark count rates (very low noise profiles). Commercial availability is expected to be quickly approaching. A polar array of 4H-SiC or III-Nitride LTV APD based detectors, operating in Geiger mode, offer environmentally robust detection, require minimal power consumption, and allow for the very low noise (single photon) operation in the SBUV that is needed to detect an extremely faint muzzle flash that results from a rouge sniper.

Figure 2:
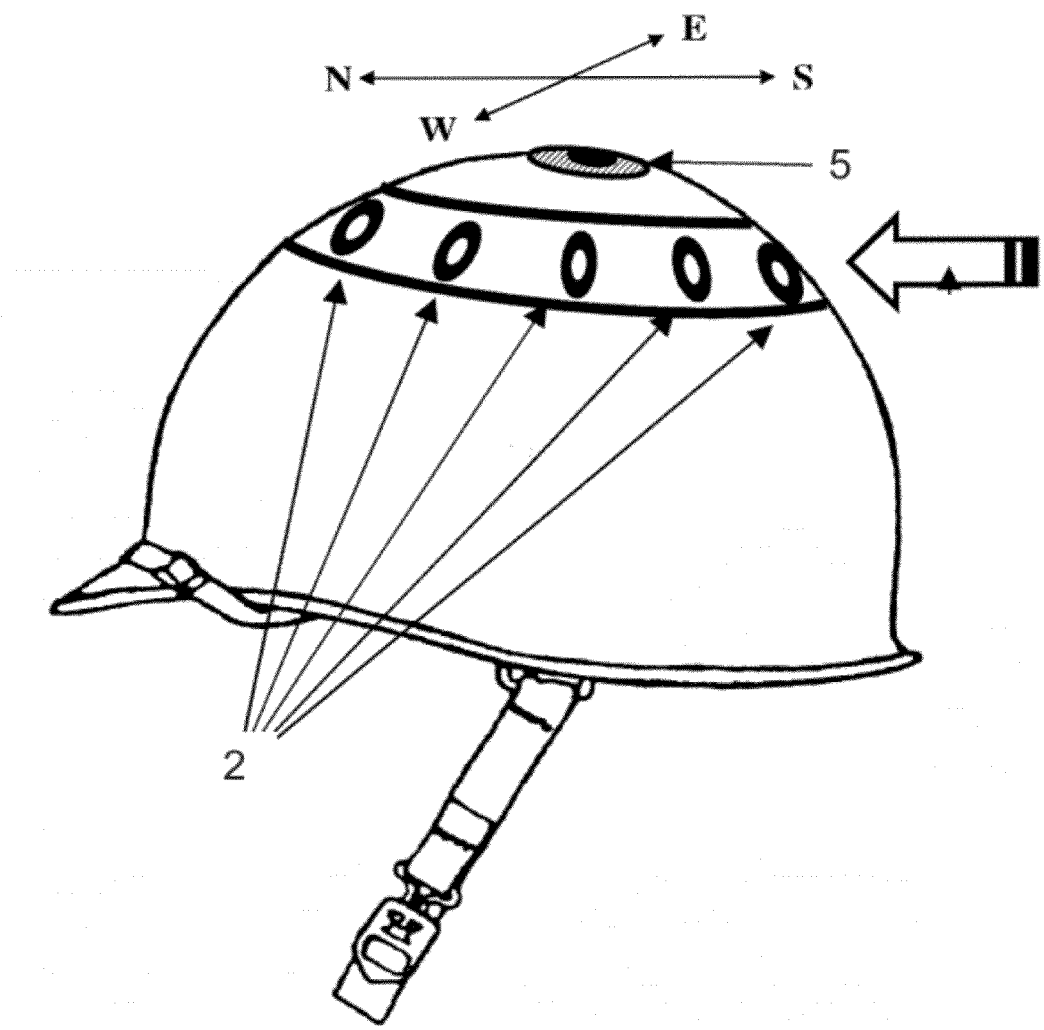
FIG. 2 is a diagrammatic illustration of Polar-array of avalanche photodiodes (APD) sensors 3 that are designed for operation in the solar blind ultra-violet (SBUV) region of the spectrum and an electronic digital registering compass 5, incoming transient target UV signal represented by the block arrow.
Figure 3:
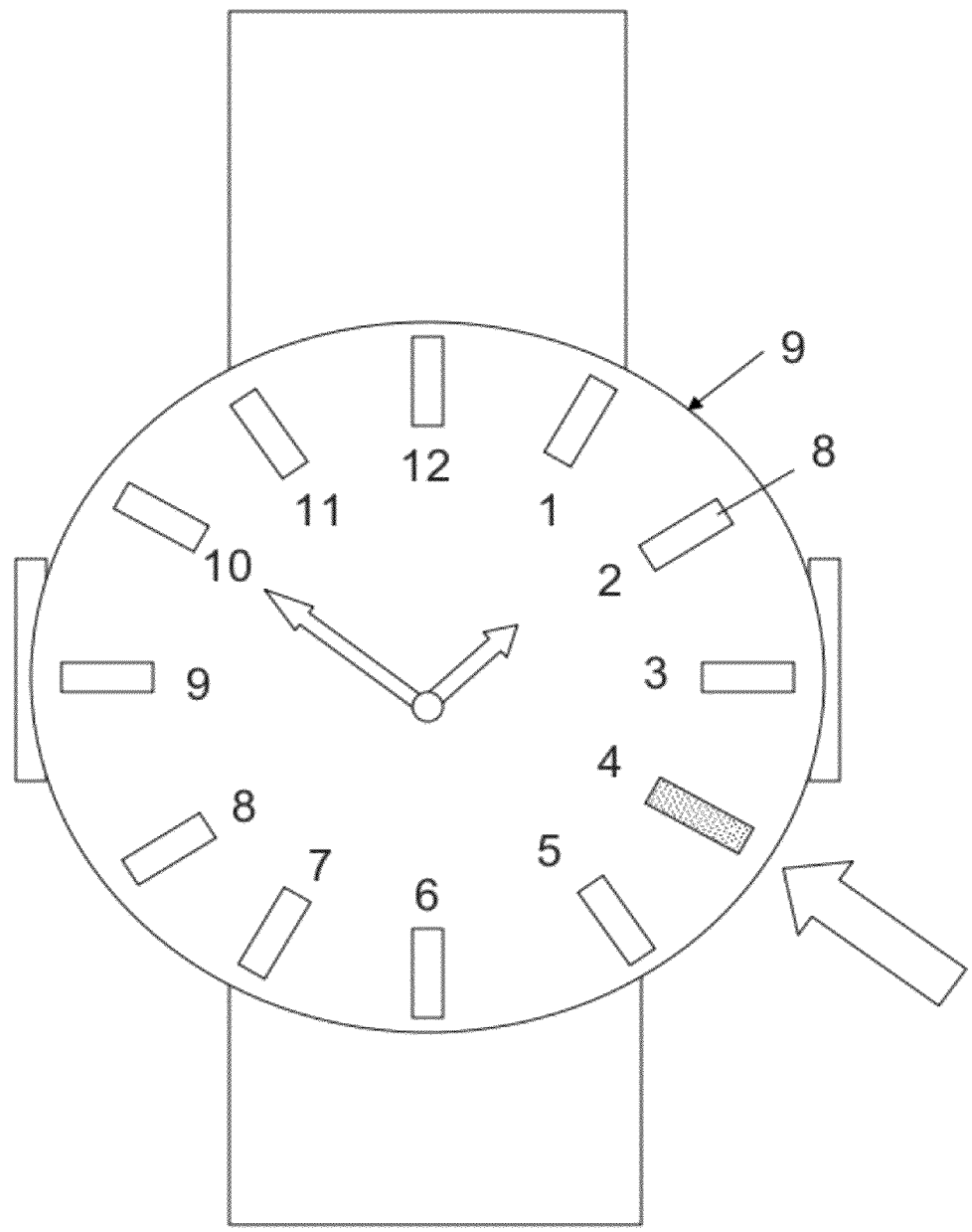
FIG. 3 is an illustration of a circular display of light emitting diodes (LED) mounted to the soldier's wrist-watch. The display shows the direction in which a sniper's muzzle flash was received by the LTV ADP sensor array and is continuously updated via the digital compass to show the correct sniper direction regardless of solider position or rotation.
Figure 4:
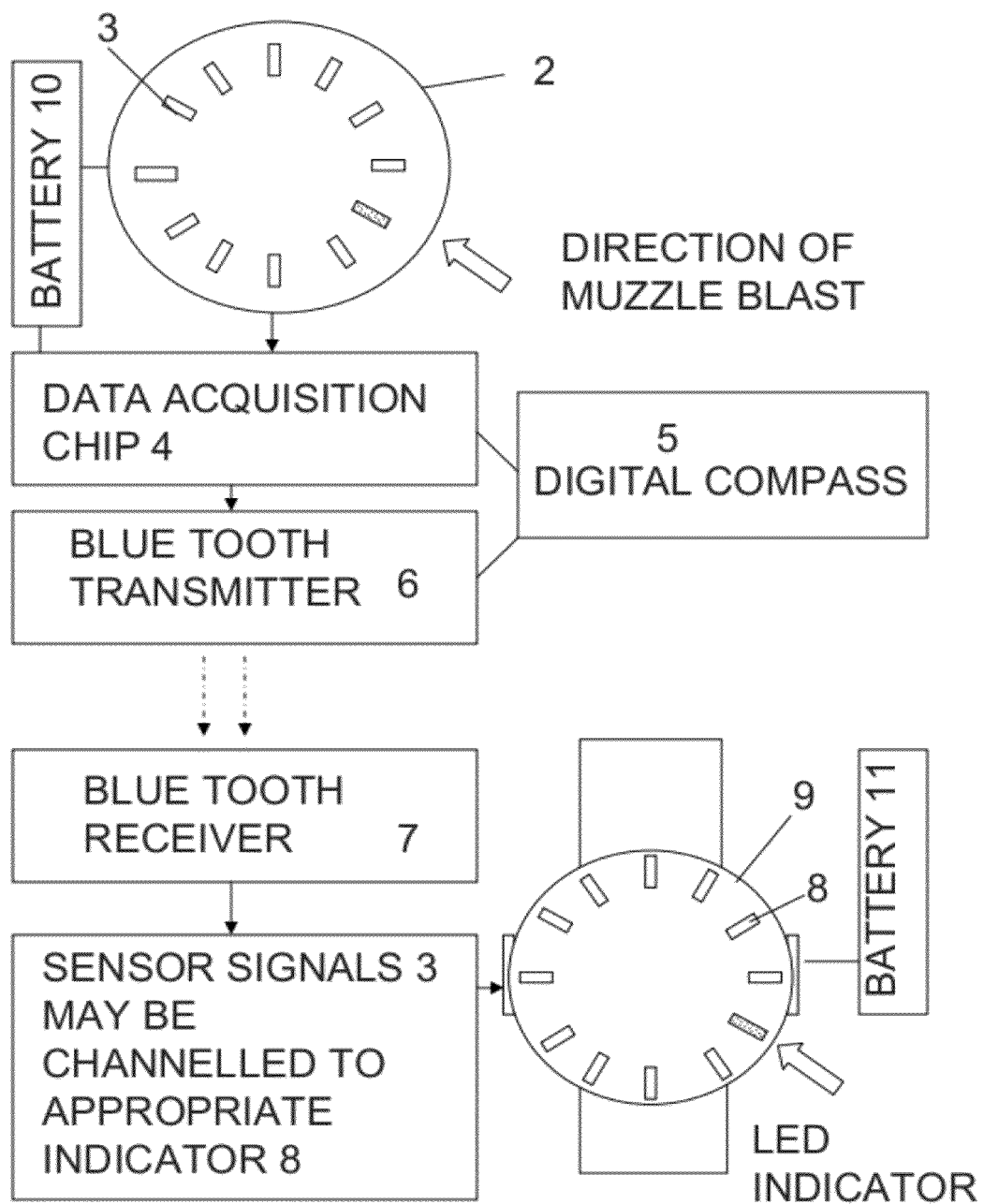
FIG. 4 is an overall diagram of system components of a preferred embodiment of the present invention.

A preferred embodiment sniper detection device comprises a polar-array of APD detectors 3 (and required electrical circuitry) mounted within or upon, for example, each soldier's helmet. Preferably, 360 degrees of sensor coverage is provided. A coordinate registering digital compass 5 may also be mounted within or upon the helmet or body of the soldier. As shown in FIG. 4, upon detection of a blast or flash from sniper fire, signals from the sensors or detectors 3 are processed by a data acquisition chip, which may be in the form of a microprocessor, processor, computer, programmable logic, or the like. A digital compass 5 detects the orientation of the body 2 and registers the direction vis-à-vis the detected signal. Although the detectors 3 and LED indicator 9 may be interconnected by conventional wiring, a preferred embodiment employs wireless circuitry transmitter 6, which may be Blue tooth, and a receiver 7, which also may be Bluetooth. Each detector 3 may have an associated indicator 8, which may for example, be an LED indicator. Although a one-to-one correspondence is shown in FIG. 4, this is merely exemplary, and any number of sensors 3 and indicators 8 may be utilized. Each sensor 3 sends a signal representing the location on the body 2 from which coordinate information of the directional orientation of the body 2 (or helmet) is added by the digital compass. The circular LED display 9 (which may be worn on the soldier's wrist) preferably has a predetermined orientation (such as north representing the top or twelve O'clock on the watch) which is know to the operator. The signal from the sensor 3 gains the location/directional information from the digital compass, and is transmitted for reception at the LED indicator 9. The system is capable of real-time wireless communication with the registering digital compass, as depicted in FIGS. 3 and 4. As illustrated in FIG. 2, the polar-array of SBUV sensitive avalanche photodiodes (APD) (approx. 6-8 sensors) 3 are mounted within the body of a soldier's helmet 2. Each detector is specially designed to be insensitive to visible or IR light, or spectrally filtered to block such radiation. The D.C. power and needed detector electrical circuitry can be self-contained within the helmet structure. A digital registering compass will continuously monitor direction and orientation of the sensor mounted coordinates (as depicted in FIG. 2). Upon detection of a transient event in the SBUV (i.e., a signal above some threshold value and fairly short in duration), a coordinate "stamp" is recorded within a microprocessor that relates a particular detector to a fixed direction, e.g., south-cast, as depicted by element c in FIG. 2. The coordinate stamp is communicated to a circular light emitting diode (LED) display mounted on the soldier's wrist via an appropriate wireless communications protocol e.g., Bluetooth, as depicted by the arrow in FIG. 3. The coordinate stamp is updated via the digital compass and registered on the LED display at a sufficiently high rate, e.g., 20 Hz, such that the correct direction of the sniper fire is continuously and correctly displayed on the wrist mounted monitor regardless of soldier's rotation or movement. Each array of sensors may be individually connected to the array of indicators 9 or, optionally, a central receiver may process the signals for transmission between the bodies 2 such that a soldier may receive signals on the indicator 9 from another soldier's body 2.

A preferred embodiment operates in the ultraviolet region of the electromagnet spectrum often referred to the Solar Blind UV, i.e., between 240-290 nm. This region was specifically chosen due to its extremely low degree of ambient radiation due to the environment which is usually construed as optical noise. The envisioned optimum detector scheme may utilize UV avalanche photodetectors (APD) operating under Geiger mode biasing. The optimum effective overall package for ease of use may include a polar array of UV sensors and the circuitry may be mounted in the structure of the soldiers helmet. A digital compass (which also may be mounted within the helmet) may be operated to constantly conveys the sensor array direction/orientation and communicate information via wireless communication to a LED display 9 that may be worn on the soldier's wrist. Once a target optical signal is recorded by one or more APDs, the digital compass 5 records and associates a location "stamp" in the direction identified by the APD sensor(s). This information updated to correct for any movement of the soldier after the event so that the correct location of the sniper fire is constantly pointing to the correct location when viewed on the LED display.

Although various preferred embodiments of the present invention have been described herein in detail to provide for complete and clear disclosure, it will be appreciated by those skilled in the art, that variations may be made thereto without departing from the spirit of the invention.

The foregoing description is illustrative of particular embodiments of the invention, but is not meant to be a limitation upon the practice thereof. The following claims, including all equivalents thereof, are intended to define the scope of the invention. As used in the following claims, the term "processor" means one or more processing units, central processing units, processor cores, microprocessors, digital signal processors, multiprocessors, computers, and/or controllers, which may be connected together or to other circuitry in a manner known to those of ordinary skill in the art. As used in the foregoing claims, the term "body" includes object(s), person, and/or vehicle.

It should be emphasized that the above-described embodiments are merely possible examples of implementations. Many variations and modifications may be made to the above-described embodiments. All such modifications and variations are intended to be included herein within the scope of the disclosure and protected by the following claims.

The invention claimed is:

1. A detector assembly for detecting a flash from the firing of a weapon comprising:
   a first support;
   a plurality of sensors supported by the first support for detecting light from the flash; the sensors operating to only receive light in the Solar Blind Ultraviolet (SBUV) spectral region of the electromagnetic spectrum from approximately 100 nm to approximately 290 nm which is essentially devoid of solar radiant energy so as to minimize the effect of solar ambient radiance on sensor detection;
   a directional indicator for indicating the directional location of the first support; and
   an indicator assembly comprising at least one indicator; the at least one indicator operating to display the directional location of the flash.

2. The detector assembly of claim 1 wherein the operating range of the sensors is approximately 230 nm to approximately 290 nm.

3. The detector assembly of claim 1 wherein the sensors comprise avalanche photo detectors.

4. The detector assembly of claim 1 wherein the sensors are UV avalanche photodetectors operated in the Geiger mode, and wherein the sensors provide 360 degrees of coverage.

5. The detector assembly of claim 1 wherein the first support is a helmet.

6. The detector assembly of claim 1 wherein the indicator assembly comprises a wrist mounted support with a plurality of LED indicators.

7. The detector assembly of claim 1 further including a transmitter and receiver, the transmitter being operationally connected to the plurality of sensors and directional indicator, and a receiver operationally connected to the indicator assembly;

the transmitter operating to transmit data relating to the directional location of the flash to the receiver for display by the indicator assembly.

8. The detector assembly of claim 7 wherein the transmitter and receiver utilize wireless technology.

9. The detector assembly of claim 1 wherein the directional indicator comprises a plurality of indicators which indicate the direction of the flash using polar coordinates.

10. The detector assembly of claim 1 wherein the directional indicator comprises a plurality of indicators comprising at least north, south, east and west indicators.

11. The detector assembly of claim 1 comprising a first component which is supported by head gear and a second component which is removably attached to a human body, the first component comprising the plurality of sensors and directional indicator, the second component comprising the a directional indicator for indicating the indicator assembly.

12. The detector assembly of claim 11 wherein the first component is contained within a helmet and the second component is wrist mounted.

13. The detector assembly of claim 12 wherein the second component comprises a wrist watch.

14. A device for detecting a flash from the firing of a weapon within the solar blind ultraviolet range of light comprising:
   a first support;
   at least one sensor supported by the first support for detecting light from the flash;
   a directional indicator for indicating the directional location of the first support, the at least one sensor configured to only receive light in the Solar Blind Ultraviolet (SBUV) spectral region of the electromagnetic spectrum from approximately 100 nm to approximately 290 nm which is essentially devoid of solar radiant energy so as to minimize the effect of solar ambient radiance on sensor detection; and
   an indicator assembly comprising at least one indicator; the at least one indicator operating to display the directional location of the flash.

15. The device of claim 14 wherein the device is configured to be attached to a body for carriage thereon.

16. The device of claim 14 further comprising a power source supported by the human body, the at least one sensor being powered by electrical power from the power source.

17. The device of claim 14 wherein the at least one sensor is an UV avalanche photodetectors operated in the Geiger mode.

18. The device of claim 14 further including a transmitter and receiver, the transmitter being operationally connected to the plurality of sensors and directional indicator, and a receiver operationally connected to the indicator assembly; the transmitter operating to transmit data relating to the directional location of the flash to the receiver for display by the indicator assembly.

19. The device of claim 18 wherein the transmitter and receiver utilize wireless technology.

20. The device of claim 14, wherein the operating range of the at least one sensor is approximately 230 nm to approximately 290 nm.

21. A method of detecting weapons fire using at least one sensor configured to receive light in the Solar Blind Ultraviolet (SBUV) spectral region of the electromagnetic spectrum so as to minimize the effect of solar ambient radiance on sensor detection, the method comprising;
   receiving information from the at least one sensor the at least one sensor operating to only receive light in the Solar Blind Ultraviolet spectral region from approximately 100 nm to approximately 290 nm which is essentially devoid of solar radiant energy;
   processing the sensor information to determine a directional orientation from which weapons fire originated;
   displaying, on an indicator assembly, the directional orientation of the weapons fire.

22. The method according to claim 21, wherein the processing does not include receiving and/or processing of any acoustic signals corresponding to the weapons fire.

23. The device of claim 14 further comprising at least one spectral filter configured to block radiation received by the at least one sensor.

* * * * *